United States Patent [19]

Wiezer et al.

[11] Patent Number: 4,504,661

[45] Date of Patent: Mar. 12, 1985

[54] POLYTRIAZINYLAMINES, PROCESS FOR THEIR PREPARATION

[75] Inventors: Hartmut Wiezer, Gersthofen; Gerhard Pfahler, Augsburg, both of Fed. Rep. of Germany

[73] Assignee: Hoechst Aktiengesellschaft, Fed. Rep. of Germany

[21] Appl. No.: 273,057

[22] Filed: Jun. 12, 1981

[30] Foreign Application Priority Data

Jun. 19, 1980 [DE] Fed. Rep. of Germany ....... 3022896

[51] Int. Cl.³ .................. C07D 401/12; C07D 401/14
[52] U.S. Cl. .................................... 544/198; 544/209; 528/423; 524/100
[58] Field of Search ................ 544/198, 209; 528/423; 524/100

[56] References Cited

U.S. PATENT DOCUMENTS

| 4,086,204 | 4/1978 | Cassandrini et al. | 544/198 |
| 4,108,829 | 8/1978 | Cassandrini et al. | 544/198 |
| 4,263,434 | 4/1981 | Cassandrini et al. | 544/198 |
| 4,288,593 | 9/1981 | Rody | 544/198 |
| 4,294,963 | 10/1981 | Rody | 544/198 |
| 4,315,859 | 2/1982 | Nikles | 544/209 |
| 4,321,374 | 3/1982 | Morimura et al. | 544/198 |
| 4,335,242 | 6/1982 | Wiezer et al. | 544/198 |
| 4,376,836 | 3/1983 | Wiezer et al. | 544/198 |
| 4,386,177 | 5/1983 | Loffelman | 544/198 |
| 4,400,505 | 8/1983 | Loffelman et al. | 544/198 |
| 4,409,348 | 10/1983 | Wiezer et al. | 544/198 |

FOREIGN PATENT DOCUMENTS 2719131 1/1977 Fed. Rep. of Germany .
2752740 1/1978 Fed. Rep. of Germany .

Primary Examiner—John M. Ford
Attorney, Agent, or Firm—Connolly and Hutz

[57] ABSTRACT

Polytriazinylpiperidylamines of the general formula

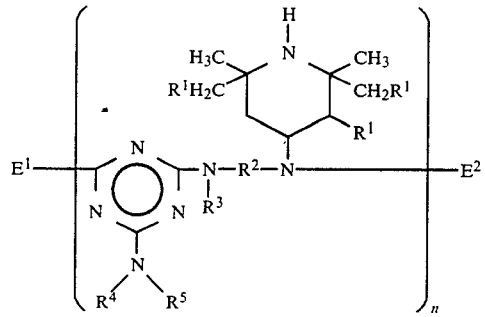

are obtained by reacting cyanuric halides with a monofunctional amino compound and a difunctional amine, it being necessary for at least the difunctional amine to be substituted by a polyalkylpiperidyl radical. The new resinous polymers have a very low volatility. They have an atactic structure and are used to stabilize synthetic polymers towards photoinduced oxidative degradation.

6 Claims, No Drawings

POLYTRIAZINYLAMINES, PROCESS FOR THEIR PREPARATION

The invention relates to new polytriazinylpiperidylamines, a process for their preparation and their use as light stabilizers with an additional antioxidative action.

The new compounds are characterized by the general formula (I)

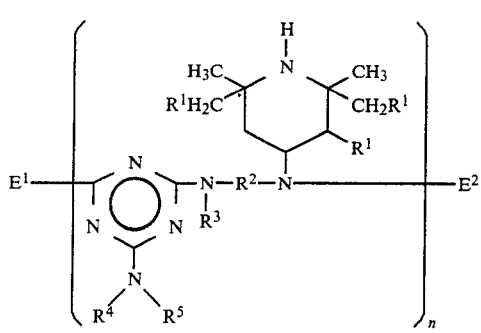

in which n denotes an integer from 1 to 200, preferably from 1 to 50 and especially from 1 to 15, the polymer chain having an "atactic" structure when $n>1$, $R^1$ denotes hydrogen or $C_1$- to $C_5$-alkyl, preferably hydrogen or methyl and especially hydrogen, and $R^2$ represents $C_2$- to $C_{18}$-alkylene, preferably $C_2$- to $C_{12}$-alkylene and especially $C_2$- to $C_6$-alkylene, or $C_2$- to $C_{12}$-bis-(propoxy)-alkylene, or $C_6$- to $C_{18}$-mono-, di- or tri-cycloalkylene, preferably $C_6$- to $C_{12}$-mono-, di- or tri-cycloalkylene, in which, in the first case, two C atoms can be replaced by N atoms which can carry propylene groups, or represents $C_6$- to $C_{18}$-arylene, preferably phenylene, or $C_7$- to $C_{18}$-aralkylene, or also, if $n=1$, $R^2$ can represent a group of the formula (II)

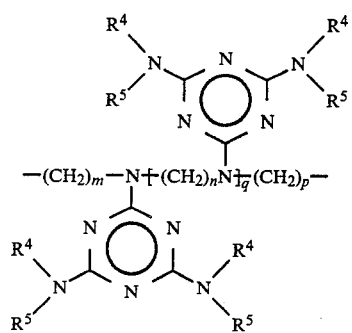

in which m, n and p are integers from 2 to 6, preferably 2 or 3, q is an integer from 0 to 3 and $R^4$ and $R^5$ have the meanings given below. $R^3$ is hydrogen or $C_1$- to $C_{18}$-alkyl, or $C_5$- to $C_{12}$-cycloalkyl, or $C_7$- to $C_{14}$-aralkyl, preferably hydrogen, $C_1$- to $C_8$-alkyl, $C_5$- to $C_{12}$-cycloalkyl or $C_7$- to $C_9$-phenylalkyl, but especially hydrogen. $R^4$ and $R^5$ are identical or different and represent hydrogen, $C_1$- to $C_{18}$-alkyl, preferably $C_1$- to $C_8$-alkyl, $C_5$- to $C_{12}$-cycloalkyl or $C_7$- to $C_{14}$-aralkyl, preferably $C_7$- to $C_9$-phenylalkyl, or polyalkylpiperidyl of the formula (III)

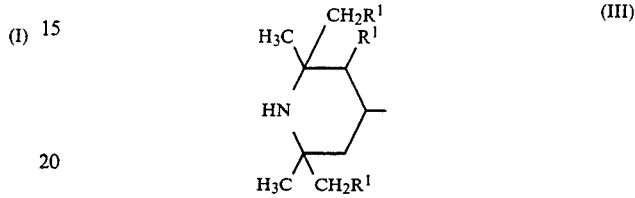

in which $R^1$ has the meaning given above. Provided that $R^4$ is one of the groups mentioned above, $R^5$ can also have the meaning of $C_1$- to $C_{18}$-alkoxypropyl, preferably $C_1$- or $C_2$-alkoxypropyl, or $C_2$- to $C_4$-hydroxyalkyl, or $C_2$- to $C_5$-dimethylaminoalkyl or -diethylaminoalkyl or, when $n>1$, can also represent a group of the formula —$R^2NHR^3$ in the case where $R^4=$Pip, or a group of the formula —$R^2$NHPip in the case where $R^4=R^3$, $R^2$, $R^3$ and $R^4$ having the meanings given above and Pip being a group of the formula (III). $E^1$ is a halogen atom, preferably chlorine, or the group

and $E^2$ is hydrogen or a triazine ring of the formula (IV)

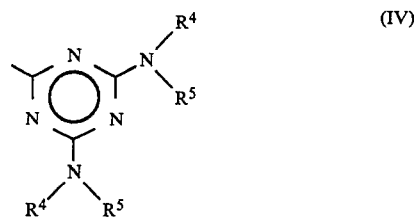

in which $R^4$ and $R^5$ have the meanings mentioned above.

The new triazine stabilizers are obtained starting from unsubstituted or partially substituted cyanuric halides. The synthesis can therefore be carried out, in principle, using several process variants, which are outlined in the following simplified reaction scheme.

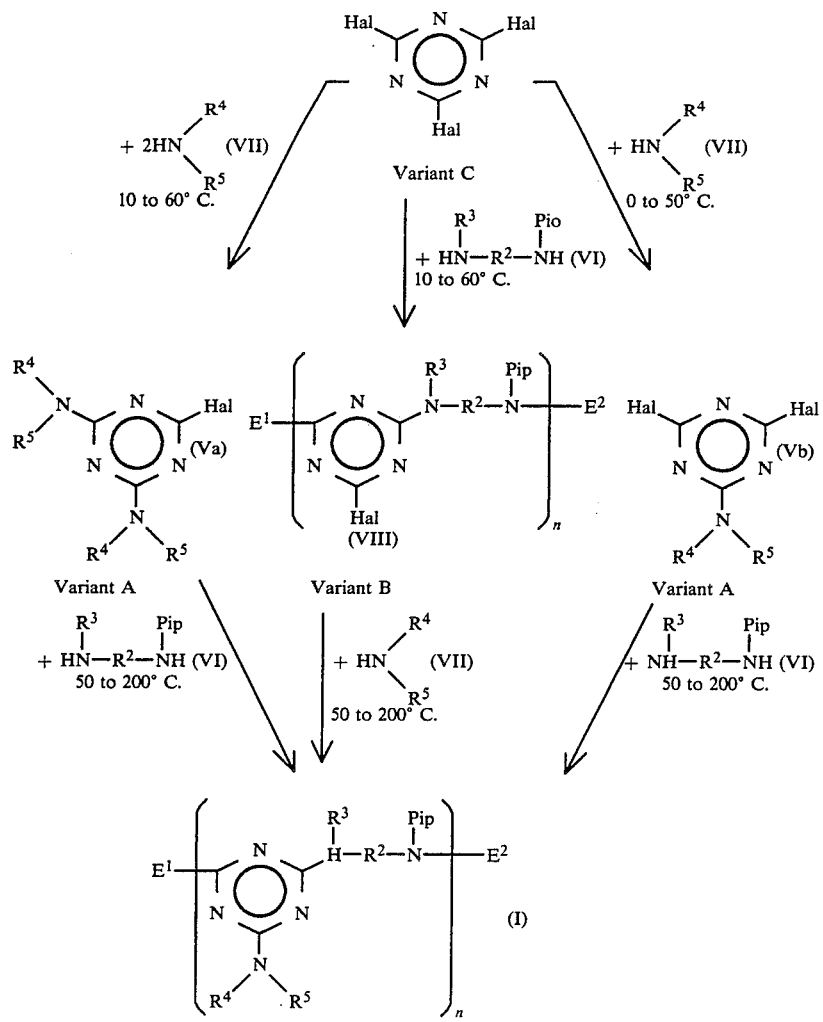

In the formulae of the reaction scheme, n, $R^2$, $R^3$, $R^4$, $R^5$, $E^1$ and $E^2$ have the meanings given above; Pip represents a radical of the formula (III).

According to variant A, for the preparation of those polytriazinylamines of the formula (I) in which $n=1$, $E^1$ has the meaning of a radial

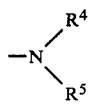

and $E^2$ has the meaning of a radical of the formula (IV), a monohalogenotriazine of the formula (Va), and, for the preparation of polytriazines of the formula (I) in which $n>1$, a dihalogenotriazine of the formula (Vb), is reacted with the 0.8- to 1.4-fold, preferably the 1.0- to 1.2-fold and especially the 1- to 1.05-fold molar amount of a polyamine of the formula (VI).

Variant B consists of the reaction of a polytriazine of the formula (VIII) with the 0.8- to 1.4-fold, preferably the 1.0- to 1.2-fold and especially the 1.0- to 1.05-fold equivalent amount of an amine of the formula (VII) and is particularly suitable for the preparation of polytriazines of the formula (I) in which $R^2$ does not have the meaning of a radical of the formula (II).

Variant C is a so-called multi-step one-pot process in which, firstly, a cyanuric halide, preferably cyanuric chloride, is reacted with the 1.9- to 2.1-fold, preferably the 1.95- to 2.05-fold and especially the two-fold molar amount of an amine of the formula (VII) for the synthesis of the intermediates (Va), with the 0.8- to 1.3-fold, preferably the 0.9- to 1.1-fold and especially the equimolar amount of the said amine for the synthesis of the intermediates (Vb), and with the 0.8- to 1.4-fold, preferably the 1.0- to 1.2-fold and especially the 1- to 1.05-fold molar amount of a diamine of the formula (VI) for the preparation of the intermediate (VIII). The intermediates (Va), (Vb) and (VIII) are then reacted, without isolation, to give the desired triazine (I), under the conditions given for variants A and B.

The reactions are carried out in inert organic solvents such as, for example, petroleum ether, benzines, acetone, ether, dioxan, benzene, toluene, xylene, cumene, mesitylene or mixtures thereof.

Variants A and B require reaction temperatures of 50° to 200°, preferably 80° to 180° and especially 100° to 160° C. Using the process according to variant C, the monosubstitution of the cyanuric halide to give the compound (Vb) is carried out at 0° to 50°, preferably 0° to 25° and especially 0° to 10° C., and the disubstitution of the cyanuric halide to give (Va) or (VIII) is carried out at 10° to 60°, preferably 20° to 50° and especially 40° to 50° C.

In the preparation of the new compounds, inorganic bases are added as hydrogen halide acceptors. Examples of suitable bases are sodium hydroxide, potassium hydroxide, sodium carbonate and potassium carbonate, in solid form or in aqueous solution. The addition of phase-transfer catalysts, that is to say, for example, compounds from the group comprising quaternary ammonium salts, in amounts of 0.01 to 1% by weight, relative to the end product, proves advantageous for accelerating the reaction.

Examples of monohalogenotriazine intermediates of the formula (Va) are: 2-chloro-4,6-bis-[N-(2,2,6,6-tetramethyl-4-piperidyl)-3-methoxypropylamino]-1,3,5-triazine, 2-chloro-4,6-bis-[N-(2,2,6,6-tetramethyl-4-piperidyl)-3-ethoxypropylamino]-1,3,5-triazine, 2-chloro-4,6-bis-[N-(2,2,6,6-tetramethyl-4-piperidyl)-3-octadecyloxypropylamino]-1,3,5-triazine, 2-chloro-4,6-bis-[N-(2,2,6,6-tetramethyl-4-piperidyl)-3-dimethylaminopropylamino]-1,3,5-triazine, 2-chloro-4,6-bis-[N-(2,2,6,6-tetramethyl-4-piperidyl)-2-diethylaminoethylamino]-1,3,5-triazine, 2-chloro-4,6-bis-[N-(2,2,6,6-tetramethyl-4-piperidyl)-4-diethylaminobutylamino]-1,3,5-triazine, 2-chloro-4,6-bis-[N-(2,2,6,6-tetramethyl-4-piperidyl)-butylamino]-1,3,5-triazine, 2-chloro-4,6-bis-[N-(2,2,6,6-tetramethyl-4-piperidyl)-octadecylamino]-1,3,5-triazine, 2-chloro-4,6-bis-[N-(2,2,6,6-tetramethyl-4-piperidyl)-amino]-1,3,5-triazine, 2-chloro-4,6-bis-[N-(2,2,6,6-tetramethyl-4-piperidyl)-cyclohexylamino]-1,3,5-triazine and 2-chloro-4,6-bis-[N-(2,2,6,6-tetramethyl-4-piperidyl)-cyclododecylamino]-1,3,5-triazine.

Examples of dichlorotriazine intermediates of the formula (Vb) are: 2,4-dichloro-6-[N-(2,2,6,6-tetramethyl-4-piperidyl)-3-hydroxypropylamino]-1,3,5-triazine, 2,4-dichloro-6-[N-(2,2,6,6-tetramethyl-4-piperidyl)-2-methoxypropylamino]-1,3,5-triazine, 2,4-dichloro-6-[N-(2,2,6,6-tetramethyl-4-piperidyl)-3-ethoxypropylamino]-1,3,5-triazine, 2,4-dichloro-6-[N-(2,2,6,6-tetramethyl-4-piperidyl)-3-octyloxypropylamino]-1,3,5-triazine, 2,4-dichloro-6-[N-(2,2,6,6-tetramethyl-4-piperidyl)-3-tridecyloxypropylamino]-1,3,5-triazine, 2,4-dichloro-6-[N-(2,2,6,6-tetramethyl-4-piperidyl)-3-octadecyloxypropylamino]-1,3,5-triazine, 2,4-dichloro-6-[N-(2,2,6,6-tetramethyl-4-piperidyl)-3-dimethylaminopropylamino]-1,3,5-triazine, 2,4-dichloro-6-[N-(2,2,6,6-tetramethyl-4-piperidyl)-3-diethylaminopropylamino]-1,3,5-triazine, 2,4-dichloro-6-[N-(2,2,6,6-tetramethyl-4-piperidyl)-2-dimethylaminoethylamino]-1,3,5-triazine, 2,4-dichloro-6-[N-(2,2,6,6-tetramethyl-4-piperidyl)-2-diethylaminoethylamino]-1,3,5-triazine, 2,4-dichloro-6-[N-(2,2,6,6-tetramethyl-4-piperidyl)-4-diethylaminobutylamino]-1,3,5-triazine, 2,4-dichloro-6-[N-(2,2,6,6-tetramethyl-4-piperidyl)-4-diethylamino-1-methylbutylamino]-1,3,5-triazine, 2,4-dichloro-6-[N-(2,3,6-trimethyl-2,6-diethyl-4-piperidyl)-3-methoxypropylamino]-1,3,5-triazine, 2,4-dichloro-6-dioctadecylamino-1,3,5-triazine, 2,4-dichloro-6-butylamino-1,3,5-triazine, 2,4-dichloro-6-octadecylamino-1,3,5-triazine, 2,4-dichloro-6-dicyclohexylamino-1,3,5-triazine and 2,4-dichloro-6-[N-(2,2,6,6-tetramethyl-4-piperidyl)-butylamino]-1,3,5-triazine.

Examples of compounds of the formula (VI) are: 1-cyclododecyl-1,5,9-triazanonane, 1,9-bis-cyclododecyl-1,5,9-triazanonane, 1-[N-(2,2,6,6-tetramethyl-4-piperidyl)]-1,5,9-triazanonane, 1-[N-(2,2,6,6-tetramethyl-4-piperidyl)]-1,5,8,12-tetraazadodecane, N-(2,2,6,6-tetramethyl-4-piperidyl)-ethylenediamine, N-(2,2,6,6-tetramethyl-4-piperidyl)-hexamethylenediamine, N-(2,2,6,6-tetramethyl-4-piperidyl)-N'-isopropyl-hexamethylenediamine, N-(2,2,6,6-tetramethyl-4-piperidyl)-N'-cyclododecylhexamethylenediamine, N,N'-bis-(cyclododecyl)-hexamethylenediamine, N-(2,2,6,6-tetramethyl-4-piperidyl)-1,3-bis-aminomethylcyclohexane, N-(2,2,6,6-tetramethyl-4-piperidyl)-bis-(3-aminopropyl)-piperazine, N-(2,2,6,6-tetramethyl-4-piperidyl)-dicyclohexylmethane-4,4'-diamine, N-(2,2,6,6-tetramethyl-4-piperidyl)-4,7-dioxadecane-1,10-diamine and N-(2,2,6,6-tetramethyl-4-piperidyl)-bis-3,8-aminomethyl-tricyclo[4,3,0,1$^{2,5}$]decane.

Examples of compounds of the formula (VII) are: N-(2,2,6,6-tetramethyl-4-piperidyl)-3-methoxypropylamine, N-(2,2,6,6-tetramethyl-4-piperidyl)-3-ethoxypropylamine, N-(2,2,6,6-tetramethyl-4-piperidyl)-3-octyloxypropylamine, N-(2,2,6,6-tetramethyl-4-piperidyl)-3-tridecyloxypropylamine, N-(2,2,6,6-tetramethyl-4-piperidyl)-3-octadecyloxypropylamine, N-(2,2,6,6-tetramethyl-4-piperidyl)-3-dimethylaminopropylamine, N-(2,2,6,6-tetramethyl-4-piperidyl)-3-diethylaminopropylamine, N-(2,2,6,6-tetramethyl-4-piperidyl)-2-dimethylaminoethylamine, N-(2,2,6,6-tetramethyl-4-piperidyl)-2-diethylaminoethylamine, N-(2,2,6,6-tetramethyl-4-piperidyl)-4-diethylaminobutylamine, 2,2,6,6-tetramethyl-4-piperidylaminopropan-3-ol, N-(2,2,6,6-tetramethyl-4-piperidyl)-4-diethylamino-1-methylbutylamine, 2,2,6,6-tetramethyl-4-amino-piperidine, N-(2,2,6,6-tetramethyl-4-piperidyl)-butylamine, N-(2,2,6,6-tetramethyl-4-piperidyl)-octadecylamine and N-(2,2,6,6-tetramethyl-4-piperidyl)-cyclododecylamine.

The reaction of cyanuric acid halides with primary or secondary monoamines or polyamines to give defined compounds or polymeric triazines has been the state of the art for a long time [J. Amer. Chem. Soc. 73 (1951), No. 7, page 2,981 et seq.; U.S. Pat. No. 2,544,071; and Swiss Patent Specifications No. 342,784 and 342,785].

Polytriazine compounds of the formula

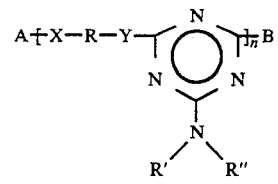

having "isotactically" incorporated diamino units linking the triazine rings, in which X and Y can be identical or different and denote —O—, —S— or

(German Offenlegungsschrift No. 2,636,144), are also known.

In contrast, the products according to the invention are polytriazines having an "atactic" structure, because the polymerization with diamines of the formula

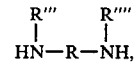

that is to say in which

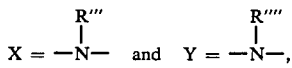

based on the above formula, takes place in accordance with the law of statistics on account of the virtually identical reactivity of the two amino groups. Even in diamines of the formula

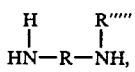

the reactivities of the amino groups are to be regarded as equivalent, so that the formation of "atactic" triazine polymers is also to be expected in this case.

The fact that even those compounds according to the invention in which $R^5$ has the meaning of a hydroxyalkyl, alkoxypropyl or dialkylaminopropyl group can be prepared was in no way predictable, because these groups can likewise react with acid chlorides, analogously to the —NH group, and it was therefore to be expected that bridges would be formed between two different triazine rings, which would have led to undesirable crosslinked products. Publications on the known formation of cyanuric acid esters from alcohols which can also be formed from alkoxyalkyl groups by ether scission on account of significant amounts of hydrogen halide, and also on the synthesis of cyanuric acid dialkylamines from cyanuric halide and tertiary amines, such as, for example, triethylamine, alkylpiperidine and alkylmorpholine, suggested that a reaction course of this type was completely possible, if not even preferential [Ullmann Volume 9 (1975), page 651; E. Kober and R. Ratz, J. Org. Chem. 27 (1962), page 2,509 et seq.].

In terms of their stabilizing properties, the new compounds are distinctly superior to the next best compounds, described in German Offenlegungsschrift No. 2,636,144, and also to the compounds of German Offenlegungsschrift No. 2,636,130 which was not to be expected, since it can be inferred from the first-mentioned Offenlegungsschrift that the number of piperidyl groups is apparently significant as regards the activity. it is in fact shown that the compounds in which, corresponding to the formula given above, the symbols X and Y represent >N—Pip (Pip=2,2,6,6-tetramethylpiperidyl) (Examples 1, 3, 4, 6 and 8), and in which no sulfur (Example 5) is present, are more active than the compounds in which X has the meaning of >N—H or —O— (Examples 2 and 7). The superiority of the stabilizers according to the invention which carry only one piperidine group in the diamino unit linking the triazine rings must therefore be regarded as exceptionally surprising. The very low volatility of the new stabilizers, which is lower than that of the best products mentioned in the said Offenlegungsschriften, is also surprising, this low volatility being an important criterion, from the point of view of application technology, in the stabilization of thin materials, such as, for example, threads, fibers and films. This unforeseeable property is particularly pronounced in the case of the products in which $R^3$ is hydrogen.

The new triazine stabilizers can be incorporated without problems into the polymers to be stabilized, and protect the latter outstandingly against photo-induced oxidative degradation. In addition to the excellent stabilizing activity, they are distinguished by their compatibility with the polymers to be stabilized, their resistance to migration on washing out with water, which has a significant role when the polymers are exposed to the weather, their heat stability, even at high processing temperatures, and their low volatility, especially in comparison with the product of Example 6 of German Offenlegungsschrift No. 2,636,144.

The pronounced activity is also surprising because, as already mentioned, it has to be assumed, on account of Examples 2 and 7 of German Offenlegungsschrift No. 2,636,144, that products which do not have two piperidyl groups of the formula (III) in the bifunctional amine forming the polymer chains would be markedly less suitable as light stabilizers.

The new compounds are suitable as stabilizers for synthetic polymers to protect them against damage by the action of oxygen, heat and light; synthetic polymers are to be understood as meaning the following: polymers which are derived from hydrocarbons having one or two units of unsaturation, for example polyolefins, such as polyethylene, which can optionally be cross-linked, polypropylene, polybut-1-ene, polyisobutene, polymethylbut-1-ene, polymethylpent-1-ene, polyisoprene, polybutadiene, polystyrene, copolymers of the monomers on which the said homopolymers are based, such as ethylene/propylene copolymers, propylene/but-1-ene copolymers, propylene/isobutene copolymers and styrene/butadiene copolymers, and also terpolymers of ethylene and propylene with a diene, such as, for example, hexadiene, dicyclopentadiene or ethylidene-norbornene; and mixtures of the abovementioned homopolymers, such as, for example, mixtures of polypropylene and polyethylene, polypropylene and polybut-1-ene, and polypropylene and polyisobutylene, or of butadiene/acrylonitrile copolymers with styrene/butadiene copolymers.

Halogen-containing vinyl polymers, such as polyvinyl chloride, polyvinylidene chloride, polyvinyl fluoride, polychloroprene and chlorinated rubbers, and also copolymers of vinyl chloride and vinylidene chloride with one another and with other olefinically unsaturated monomers.

Polymers which are derived from α,β-unsaturated acids and their derivatives, such as polyacrylates and polymethacrylates, polyacrylamides and polyacrylonitrile, and also their copolymers with one another and with other vinyl compounds, such as acrylonitrile/butadiene/styrene, acrylonitrile/styrene and acrylonitrile/styrene/acrylic acid ester copolymers.

Polymers which are derived from unsaturated alcohols and amines or their acyl derivatives or acetals, such as polyvinyl alcohol, polyvinyl acetate, stearate, benzoate and maleate, polyvinylbutyral, polyallyl phthalate and polyallylmelamine, and their copolymers with other vinyl compounds, such as ethylene/vinyl acetate copolymers. Homopolymers and copolymers which are derived from epoxides, such as polyethylene oxide or polymers which are derived from bis-glycidyl ethers.

Polyacetals, such as polyoxymethylene and polyoxyethylene, and also those polyoxymethylenes which contain ethylene oxide as a comonomer.

Polyurethanes and polyureas.

Polycarbonates.

Polyamides and copolyamides which are derived from diamines and dicarboxylic acids and/or from aminocarboxylic acids or the corresponding lactams, such as polyamide 6, polyamide 6,6, polyamide 6,10, polyamide 11 and polyamide 12.

Polyesters which are derived from dicarboxylic acids and dialcohols and/or from hydroxycarboxylic acids or their corresponding lactones, such as polyethylene terephthalate, polybutylene terephthalate and poly-1,4-dimethylol-cyclohexane terephthalate.

Crosslinked polymers which are derived on the one hand from aldehydes and on the other hand from phenols, ureas and melamines, such as phenol/formaldehyde, urea/formaldehyde and melamine/formaldehyde resins.

Finally, the new compounds can also be used as stabilizers in the field of resins and paints. Examples are thermosetting and thermoplastic acrylic resins which are used for car paints [Encyclopedia of Polymer Science and Technology, Interscience Publishers, New York, Volume 1 (1964), pages 273–276, and Volume 13 (1970), pages 530–532; "Understanding Paint" by W. R. Fuller, in American Paint Journal Co., St. Louis, 1965, pages 124–135], acrylic resin lacquers, that is to say the customary stoving lacquers [described, for example, in "Lehrbuch der Lacke und Beschichtungen" ("Textbook of Lacquers and Coatings") by H. Kittel, Volume 1, Part 2, pages 735 and 742 (Berlin, 1972), and in "Lackkunstharze" ("Synthetic Resins for Lacquers"), pages 229–235], and also, very particularly, mixtures based on thermally crosslinkable acrylic resin and styrene and also lacquers and coatings based on acrylic/melamine resin and alkyd/acrylic/melamine resin. Lacquers of this type can contain other customary light stabilizers, phenolic antioxidants, pigments, dyestuffs, metal deactivators and the like, as further additives.

The stabilization of polyolefins, styrene polymers, polyamides, poly(meth)acrylates and polyurethanes, for which the compounds are preferentially suitable, is of particular importance. Examples of these materials are high-density and low-density polyethylene, polypropylene, ethylene/propylene copolymers, polystyrene, styrene/butadiene/acrylonitrile terpolymers, mixtures of polyolefins or of styrene polymers, and also polyurethanes based on polyether or polyester.

The new stabilizers are incorporated in the polymer masses by methods which are generally conventional. The incorporation can be carried out, for example, by mixing the compounds, and optionally further additives, into the melt by the methods customary in the art, before or during the shaping operation, or also by applying the dissolved or dispersed compounds to the polymer direct, or mixing them into a solution, suspension or emulsion of the latter, the solvent subsequently being allowed to evaporate off, if appropriate. The amounts are 0.01 to 5, preferably 0.05 to 2.5, and especially 0.1 to 1.0, % by weight, relative to the material to be stabilized. The new compounds can also be added in the form of a master batch to the plastics to be stabilized, the master batch containing these compounds in a concentration of, for example, 1 to 50, preferably 2.5 to 20, % by weight.

The plastics stabilized by the addition of the substances according to the invention can optionally contain further known and customary additives, such as, for example, antioxidants based on phenol and sulfide, metal deactivators, light stabilizers, phosphite stabilizers, metal compounds, epoxy stabilisers, polyhydric alcohols, reinforcing fillers, such as chalk, talc and asbestos, and organic and/or inorganic pigments and dyestuffs.

Examples of antioxidants are those of the sterically hindered phenol type, such as 4,4'-butylidene-bis-(2,6-di-tert.-butylphenol), esters of $\beta$-(3,5-di-tert.-butyl-4-hydroxyphenyl)-propionic acid with monohydric or polyhydric alcohols or thioalcohols, ethylene glycol bis-[3,3-bis-(3'-tert.-butyl-4'-hydroxyphenyl)-butyrate], 1,1,3-tris-(5-tert.-butyl-4-hydroxy-2-methylphenyl)-butane, 1,3,5-tris-(3,5-di-tert.-butyl-4-hydroxybenzyl)-2,4,6-trimethylbenzene, Ca or Ni salts of monoethyl 3,5-di-tert.-butyl-4-hydroxybenzylphosphonate, phenolic triazine compounds, thiodipropionic acid esters of fatty alcohols, and dioctadecyl sulfide and disulfide.

The UV absorbers and light stabilizers include, for example, 2-(2'-hydroxyphenyl)-benztriazoles, such as 2-(2'-hydroxy-5'-methylphenyl)-benztriazole, 2-hydroxybenzophenones, such as 2-hydroxy-4-octyloxy-benzophenone, stabilizers from the group comprising salicylates, such as octylphenyl salicylate, nickel chelates, oxalic acid diamides and sterically hindered piperidine compounds.

Phosphites which may be mentioned are tris-nonylphenyl phosphite, tris-lauryl phosphite or also esters of pentaerythritol phosphite.

Metal compounds known as stabilizers are understood in this context as meaning: calcium, barium, strontium, zinc, cadmium, magnesium, aluminum and lead soaps of aliphatic carboxylic acids or hydroxycarboxylic acids having about 12 to 32 C atoms, salts of the said metals with aromatic carboxylic acids, such as benzoates or salicylates or also (alkyl)phenolates of these metals, and also organo-tin compounds, such as, for example, dialkyl-tin thioglycolates and carboxylates.

Examples of known epoxy stabilizers are epoxidized higher fatty acids, such as epoxidized soya bean oil, tall oil or linseed oil, or epoxidized butyl oleate and also epoxides of long-chain olefins.

Polyhydric alcohols can be, for example, pentaerythritol, trimethylolpropane, sorbitol or mannitol, that is to say preferably alcohols having 5 or 6 C atoms and 2 to 6 OH groups.

An active stabilizer combination for poly-$\alpha$-olefins, such as, for example, high-pressure, medium-pressure and low-pressure polymers of $C_2$- to $C_4$-$\alpha$-olefins, especially polyethylene and polypropylene, or of copolymers of $\alpha$-olefins of this type, consists, for example, of the following, relative to 100 parts by weight of polymer: 0.01 to 5 parts by weight of one of the compounds to be used according to the invention, 0.05 to 5 parts by weight of a phenolic stabilizer, optionally 0.01 to 5 parts by weight of a sulfur-containing co-stabilizer, and also optionally 0.01 to 3 parts by weight of a basic or neutral metal soap, such as, for example, calcium stearate or zinc stearate, or of the corresponding oxides, and also optionally 0.1 to 5 parts by weight of a phosphite and optionally 0.01 to 5 parts by weight of a known UV stabilizer from the group comprising alkoxyhydroxybenzophenones, 4-hydroxyphenylbenzotriazoles, benzylidenemalonic acid mononitrile esters or so-called quenchers, such as, for example, nickel chelates.

The plastics stabilized according to the invention can be applied in the most diverse forms, for example as films, fibers, strips or profiles or as binders for lacquers, adhesives or putties.

The following examples serve to illustrate the invention further:

EXAMPLE 1

11.4 g (0.05 mole) of N-(2,2,6,6-tetramethyl-4-piperidyl)-3-methoxypropylamine (=monofunctional educt), dissolved in 90 ml of xylene, are added dropwise, at 0° to 5° C., to a solution of 9.2 g (0.05 mole) of cyanuric chloride in 60 ml of xylene. After the addition of 2 g of powdered NaOH, the mixture is stirred for 4 hours at the same temperature. 10.0 g (0.05 mole) of N-(2,2,6,6-tetramethyl-4-piperidyl)-ethylenediamine (=bifunctional educt) are then added and the mixture is warmed to 40° C. and kept at this temperature for 30 minutes. After the addition of 4 g (0.1 mole) of powdered NaOH, the mixture is boiled under reflux for 20 hours, after which the water of reaction is removed by means of a water separator. The reaction solution is filtered hot and the solvent is then stripped from the filtrate in vacuo on a rotary evaporator. The residual resin is dried under a high vacuum at 150° C., leaving 27.5 g, which are stirred with 200 ml of hot water. The solid is filtered off with suction and dried. Yield: 24.8 g=98.8% of theory, of a brittle colorless resin with a melting point of 237°–259° C.

EXAMPLES 2 TO 30

A procedure analogous to Example 1 was followed, except that other amines were used, and solid, resinous, colorless to pale yellowish-colored resins were likewise obtained.

| Example | Monofunctional educt (amount) | Bifunctional educt (amount) |
|---|---|---|
| 2 | N—(2,2,6,6-Tetramethyl-4-piperidyl)-3-ethoxypropylamine (12.1 g = 0.05 mole) | Analogous to Example 1 |
| 3 | N—(2,2,6,6-Tetramethyl-4-piperidyl)-3-dimethylaminopropylamine (12.1 g = 0.05 mole) | Analogous to Example 1 |
| 4 | N—(2,2,6,6-Tetramethyl-4-piperidyl)-4-diethylaminobutylamine (14.2 g = 0.05 mole) | Analogous to Example 1 |
| 5 | N—(2,2,6,6-Tetramethyl-4-piperidyl)-3-octadecyloxypropylamine (23.2 g = 0.05 mole) | Analogous to Example 1 |
| 6 | no monofunctional educt | Analogous to Example 1 (instead of 10 g, 19.9 g = 0.1 mole) |
| 7 | Dioctadecylamine (26.0 g = 0.05 mole) | Analogous to Example 1 (instead of 10 g, 19.9 g = 0.1 mole) |
| 8 | N—(2,2,6,6-Tetramethyl-4-piperidyl)-butylamine (10.6 g = 0.05 mole) | Analogous to Example 1 (instead of 10 g, 19.9 g = 0.1 mole) |
| 9 | N—(2,2,6,6-Tetramethyl-4-piperidyl)-octadecylamine (20.8 g = 0.05 mole) | Analogous to Example 1 (instead of 10 g, 19.9 g = 0.1 mole) |
| 10 | as in Example 1 | N—(2,2,6,6-Tetramethyl-4-piperidyl)-1,6-diaminohexane (12.8 g = 0.05 mole) |
| 11 | as in Example 2 | N—(2,2,6,6-Tetramethyl-4-piperidyl)-1,6-diaminohexane (12.8 g = 0.05 mole) |
| 12 | as in Example 3 | N—(2,2,6,6-Tetramethyl-4-piperidyl)-1,6-diaminohexane (12.8 g = 0.05 mole) |
| 13 | N—(2,2,6,6-Tetramethyl-4-piperidyl)-3-diethylaminopropylamine (13.5 g = 0.05 mole) | N—(2,2,6,6-Tetramethyl-4-piperidyl)-1,6-diaminohexane (12.8 g = 0.05 mole) |
| 14 | Butylamine (3.65 g = 0.05 mole) | N—(2,2,6,6-Tetramethyl-4-piperidyl)-1,6-diaminohexane (12.8 g = 0.05 mole) |
| 15 | Octadecylamine (13.5 g = 0.05 mole) | N—(2,2,6,6-Tetramethyl-4-piperidyl)-1,6-diaminohexane (12.8 g = 0.05 mole) |
| 16 | Dicyclohexylamine (9.1 g = 0.05 mole) | N—(2,2,6,6-Tetramethyl-4-piperidyl)-1,6-diaminohexane (12.8 g = 0.05 mole) |
| 17 | no monofunctional educt | as in Example 10 (25.5 g = 0.1 mole) |
| 18 | as in Example 1 | N—(2,2,6,6-Tetramethyl-4-piperidyl)-bis-1,3-aminomethylcyclohexane (14.1 g = 0.05 mole) |
| 19 | as in Example 3 | N—(2,2,6,6-Tetramethyl-4-piperidyl)-bis-1,3-aminomethylcyclohexane (14.1 g = 0.05 mole) |
| 20 | Dibutylamine (6.5 g = 0.05 mole) | N—(2,2,6,6-Tetramethyl-4-piperidyl)-bis-1,3-aminomethylcyclohexane (14.1 g = 0.05 mole) |
| 21 | no monofunctional educt | as in Example 18 (28.2 g = 0.1 mole) |
| 22 | as in Example 1 | Mixture of 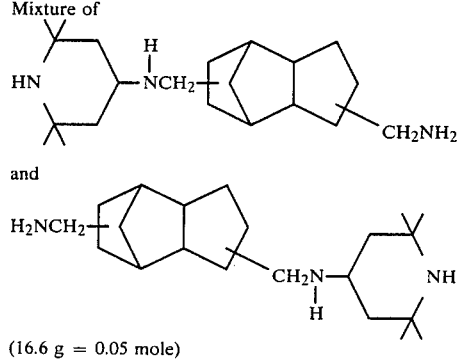 (16.6 g = 0.05 mole) |

-continued

| Example | Monofunctional educt (amount) | Bifunctional educt (amount) |
|---|---|---|
| 23 | as in Example 2 | Mixture of 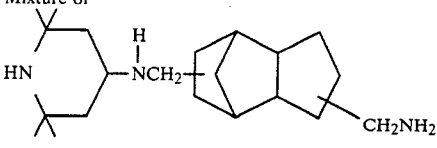 and 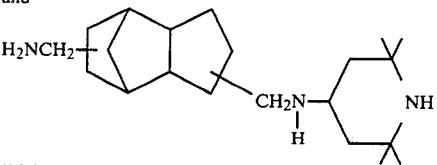 (16.6 g = 0.05 mole) |
| 24 | as in Example 3 | Mixture of 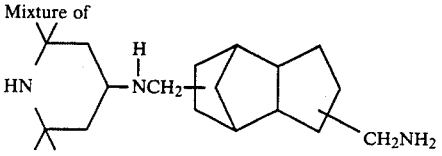 and 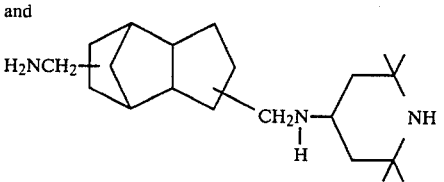 (16.6 g = 0.05 mole) |
| 25 | no monofunctional educt | as in Example 22 (33.1 g = 0.1 mole) |
| 26 | as in Example 1 | N—(2,2,6,6-Tetramethyl-4-piperidyl)-N'—isopropyl-1,6-diaminohexane (14.9 g = 0.05 mole) |
| 27 | Hexylamine (5.1 g = 0.05 mole) | N—(2,2,6,6-Tetramethyl-4-piperidyl)-N'—isopropyl-1,6-diaminohexane (14.9 g = 0.05 mole) |
| 28 | no monofunctional educt | as in Example 26 (29.7 g = 0.1 mole) |
| 29 | as in Example 1 | N—(2,2,6,6-Tetramethyl-4-piperidyl)-N'—cyclododecyl-1,6-diaminohexane (21.1 g = 0.05 mole) |
| 30 | no monofunctional educt | as in Example 29 (42.1 g = 0.1 mole) |

EXAMPLE 31

N,N',N''-Tris-{2,4-bis-[N-(2,2,6,6-tetramethyl-4-piperidyl)-3-methoxypropylamino]-1,3,5-triazin-6-yl}-N-(2,2,6,6-tetramethyl-4-piperidyl)-dipropylenetriamine 34.0 g (6/100 mole) of 6-chloro-2,4-bis-[N-(2,2,6,6-tetramethyl-4-piperidyl)-3-methoxypropylamino]-1,3,5-triazine, 5.4 g (2/100 mole) of N-(2,2,6,6-tetramethyl-4-piperidyl)-dipropylenetriamine and 2.4 g (6/100 mole) of powdered NaOH are introduced into 200 ml of xylene and the resulting mixture is stirred at the reflux temperature for 20 hours. It is then filtered hot, the filtrate is evaporated in vacuo and the residue, after treatment with warm water, is finally dried under a high vacuum. Colorless resin, yield: 36.9 g, melting point: 83° C.

EXAMPLE 32

This example shows the volatility of the new triazine stabilizers in comparison with a product of the state of the art.

The volatilities were determined in an apparatus for thermogravimetric analysis. To do this, identical amounts (500 mg) of the compounds according to the invention and of the comparison substance were heated to 300° C., in a nitrogen atmosphere, with a heating rate of 2 K./minute, and the loss of substance was measured in mg/cm² of sample surface. The results are shown in the following table:

| Stabilizer according to Example | Weight loss in mg/cm² on reaching ... °C. | | | |
|---|---|---|---|---|
| | 220 | 260 | 300 | 10 minutes at 300 |
| 1 | 0.16 | 1.58 | 3.0 | 6.16 |
| 10 | 0.32 | 1.95 | 4.74 | 7.90 |
| 17 | 0.16 | 1.63 | 3.79 | 7.11 |
| 22 (comparison+) | 0.47 | 3.48 | 10.59 | 17.38 |

+Substance according to Example 6 of German Offenlegungsschrift 2,636,144 (reaction product of cyanuric chloride and N,N—(2,2,6,6-tetramethyl-4-piperidyl)-hexamethylenediamine)

EXAMPLE 33

This example is intended to demonstrate the light-stabilizing action of the new compounds in a poly-α-olefin.

100 parts by weight of polypropylene having a melt index i₅ of about 6 g/10 minutes (determined in accordance with ASTM D 1238-62 T) and a density of 0.96 were mixed with 0.1 part by weight of pentaerythrityl tetrakis-3-(3,5-di-tert.-butyl-4-hydroxyphenyl)-propionate, 0.2 part by weight of calcium stearate and 0.1 part by weight of the stabilizer to be tested.

In order to achieve the most uniform possible distribution on the polymer granules, the stabilizers were dissolved in a solvent and the solution was added dropwise to the powdered polypropylene, whilst stirring, the bulk of the solvent being evaporated off again by simultaneous irradiation with an IR lamp.

After about 20 minutes, the calcium stearate was added and the ingredients were mixed for a further 10 minutes. Solvent residues were removed by drying at 50° C./120 minutes in a drying cabinet.

The mixture was injection-molded on a Windsor injection-molding machine of the SP 50 type, at 240° C., to give 60×60×1 mm plates. Test pieces according to DIN 53,455, shape 3, scaled down by 1:3, were stamped out of these plates. The test pieces required as comparison samples were produced analogously, but with the omission of the stabilizer to be tested or with the addition of the comparison stabilizers.

To determine the stability to light, the samples were subjected to irradiation with light intensity variations, in a Xenotest-1200 apparatus from Messrs Original Hanau Quarzlampen GmbH. The radiation intensity was modulated through UV filters (special filter glass, d=1.7 mm). The fastness to light was tested in accordance with DIN 53,387 (dry for 17 minutes, spray with water for 3 minutes, black panel temperature: 45° C., relative atmospheric humidity during the dry period: 70 to 75%). The elongation at break was measured on a tensile tester from Messrs Instron, at a drawing speed of 5 cm/minute, after a determined exposure time in hours.

| Stabilizer according to Example | Exposure time in hours | Measured elongation at break, in % of the initial value |
| --- | --- | --- |
| 10 | 1,400 | >50 |
| 22 | 1,400 | >50 |
| Polypropylene | 260 | 1 |
| Comparison[1] | 320 | 1 |
| Comparison[2] | 1,400 | 50 |

[1]without light stabilizer
[2]compound according to Example 6 of German Offenlegungsschrift 2,636,144

EXAMPLE 34

0.1 to 0.25 part by weight of the stabilizers used in Example 33 were mixed, by means of a rapid laboratory mixer, with polypropylene (®Hostalen PPU VP 1770 F from Hoechst AG) having a melt index MFI$_{190}$: 51.9 g/10 minutes (DIN 53,535). The material stabilized in this way was melted in a laboratory extruder under the customary processing conditions and processed, via a spinning pump with a multiple spinning head, to give monofilaments (87 dtex), which were then stretched in a ratio of 1:2.5. Groups of 24 of these filaments were texturized to form yarn and the yarns were processed to form test fabrics. The test pieces were subjected to the fastness-to-light test in a fadeometer and, after the indicated exposure time, subjected to the fingernail test (light rubbing of the thumbnail over the fabric). After an exposure time of 150 hours, the test fabrics stabilized with the compounds according to the invention still showed no damage.

We claim:

1. A compound of the formula:

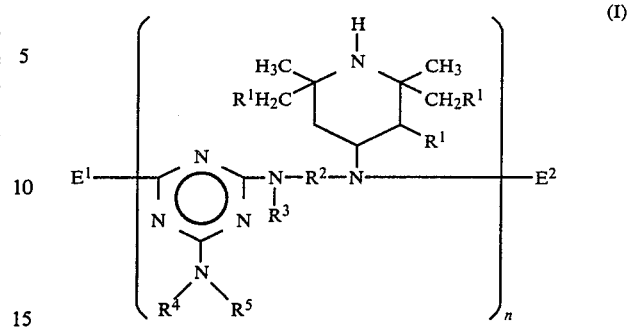

in which n is greater than 1 but not greater than 200, the polymer chain having an "atactic" structure; $R^1$ is hydrogen or $C_1$- to $C_5$-alkyl; $R^2$ represents $C_2$- to $C_{18}$-alkylene or $C_2$- to $C_{12}$-bis-(propoxy)-alkylene or $C_6$- to $C_{18}$-mono-, di- or tri-cycloalkylene, in which in the first case, two C atoms can be replaced by N atoms which can carry propylene groups, or represents $C_6$- to $C_{18}$-arylene or $C_7$- to $C_{18}$-aralkylene; $R^3$ is hydrogen or $C_1$- to $C_{18}$-alkyl or $C_5$- to $C_{12}$-cycloalkyl or $C_7$- to $C_{14}$-aralkyl; $R^4$ and $R^5$ are identical or different and represent hydrogen, $C_1$- to $C_{18}$-alkyl, $C_5$- to $C_{12}$-cycloalkyl, $C_7$- to $C_{14}$-aralkyl or a group of the formula (III)

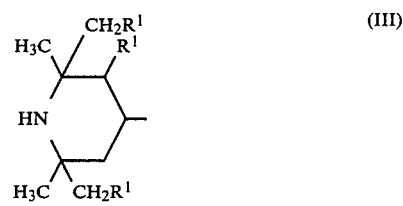

in which $R^1$ has the meaning given above, and $R^5$ additionally has the meaning of $C_1$- to $C_{18}$-alkoxypropyl or $C_2$- to $C_4$-hydroxyalkyl or $C_2$- to $C_5$-dimethylaminoalkyl or -diethylaminoalkyl, or, when n>1, $R^5$ represents a group of the formula —$R^2$NHPip in the case where $R^4=R^3$, or a group of the formula —$R^2$NHR$^3$ in the case where $R^4$=Pip, $R^2$, $R^3$ and $R^4$ having the meanings given above and Pip being a group of the formula (III); $E^1$ is a halogen atom or the group

and $E^2$ is hydrogen or a triazine ring of the formula (IV)

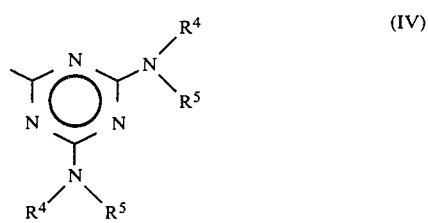

in which $R^4$ and $R^5$ have the meanings given above.

2. A compound according to claim 1, wherein $R^3$ is H.

3. A compound according to claim 1, wherein $R^5$ is $C_1$- to $C_{18}$-alkoxypropyl or $C_2$- to $C_4$-hydroxyalkyl or $C_2$- to $C_5$-dimethylaminoalkyl or -diethylaminoalkyl.

4. A process for the preparation of the compound of claim 1, which comprises first synthesizing the polytriazine of the formula (VIII)

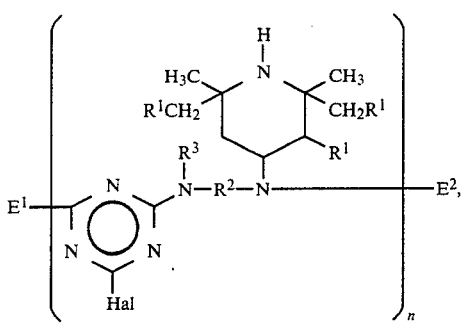

in an inert organic solvent, at 10° to 60° C., from cyanuric halide and the 0.8- to 1.4-fold molar amount of a diamine of the formula (VI)

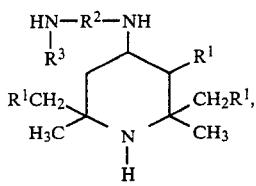

in the presence of the equivalent amount—relative to the compound (VI)—of an inorganic base used as a hydrogen halide acceptor, and then reacting the intermediate (VIII), without isolating it, with the 0.8- to 1.4-fold equivalent amount of an amine of the formula (VII)

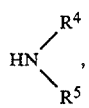

Hal, $R^1$, $R^2$, $R^3$, $R^4$, $R^5$, $E^1$ and $E^2$ in these formulae having the meanings given in claim 1 in the presence of the equivalent amount—relative to the compound (VII)—of an inorganic base, at 50° to 200° C.

5. A process for the preparation of the compound of claim 1, which comprises first synthesizing a dihalogenotriazine of the formula

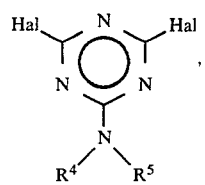

in an inert organic solvent, at 0° to 50° C., from cyanuric halide and the 0.8- to 1.3-fold molar amount of an amino compound of the formula (VII),

in the presence of the equivalent amount—relative to the compound (VII)—of an inorganic base used as a hydrogen halide acceptor, and then reacting the intermediate (Vb), without isolating it, with a compound of the formula (VI)

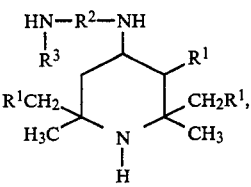

Hal, $R^1$, $R^2$, $R^3$, $R^4$ and $R^5$ in these formulae having the meanings given in claim 1, with the addition of a further amount of hydrogen halide acceptor, at 50° to 200° C.

6. A process according to claim 5, wherein $R^5$ is $C_1$- to $C_{18}$-alkoxypropyl or $C_2$- to $C_5$-dimethylaminoalkyl or -diethylaminoalkyl.

* * * * *